(12) United States Patent
Ohgane et al.

(10) Patent No.: US 6,695,458 B2
(45) Date of Patent: Feb. 24, 2004

(54) HIGH-REFLECTANCE SILVER MIRROR AND REFLECTING OPTICAL ELEMENT

(75) Inventors: Masanobu Ohgane, Kanagawa (JP); Hideyuki Hatakeyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 09/947,713

(22) Filed: Sep. 7, 2001

(65) Prior Publication Data
US 2002/0054959 A1 May 9, 2002

(30) Foreign Application Priority Data

Sep. 12, 2000 (JP) ........................ 2000-276431

(51) Int. Cl.[7] ............... G02B 5/08; G02B 7/182
(52) U.S. Cl. ............. 359/883; 359/900; 427/165; 427/166; 427/167
(58) Field of Search .................. 359/871, 883, 359/900; 427/162, 165, 166, 167

(56) References Cited

U.S. PATENT DOCUMENTS

| 4,259,409 | A | * | 3/1981 | Arnold |
| 4,556,277 | A | * | 12/1985 | Fan et al. |
| 5,535,056 | A | * | 7/1996 | Caskey et al. |
| 5,548,440 | A | * | 8/1996 | Hohenegger et al. |
| 5,757,564 | A | * | 5/1998 | Cross et al. |
| 6,127,052 | A | * | 10/2000 | Tomari et al. |
| 6,511,190 | B2 | * | 1/2003 | Ohgane |
| 2002/0132109 | A1 | * | 9/2002 | Hatakeyama et al. |

FOREIGN PATENT DOCUMENTS

HU  201360  10/1990

* cited by examiner

*Primary Examiner*—Ricky D. Shafer
(74) *Attorney, Agent, or Firm*—Fitzpatrick, Cella, Harper & Scinto

(57) ABSTRACT

A high-reflectance silver mirror has a high-reflectance film comprising a silver layer formed on a base material made of phosphorus-containing glass. The high-reflectance film is formed by a wet film-forming process on an acid-resistant protection film covering the base material. A reflecting optical element employing the high-reflectance silver mirror, and a process for producing the high-reflectance silver mirror are also provided. The high-reflectance silver mirror is producible at a reduced cost and has improved reflectivity.

15 Claims, 2 Drawing Sheets

HIGH-REFLECTANCE SILVER MIRROR AND REFLECTING OPTICAL ELEMENT

BACKGROUND OF THE INVENTION

1. Field of the Invention

The present invention relates to a high-reflectance silver mirror employing a phosphorus-containing glass base material and a process for production thereof. The present invention relates also to a reflecting optical element employing the silver mirror.

2. Related Background Art

Conventionally, the reflection layer of a mirror or the like on the reflection face thereof has been formed of a thin film of a metal with a high reflectivity such as aluminum and silver. In particular, silver has widely been used owing to its prominently high reflectivity in the visible wavelength region.

The thin metal layer of aluminum, silver, or the like has conventionally been formed by a dry process such as vacuum vapor deposition, sputtering, and ion plating. In particular, as for the silver film, it can also be formed by a wet film-forming process exemplified by a silver mirror reaction.

The thin metal film used in the silver mirror may be constituted of a single metal layer, or may have a laminate structure in combination with another layer such as an oxidation-preventing layer for preventing oxidation of the metal thin film or a reflection-increasing film for improving the reflection properties of the thin metal film.

In recent years, optical elements in various forms are commercialized which are produced by melting low-melting glass and forming the resulting melt in a mold into a desired shape of optical elements. The low-melting glass contains phosphorus in many cases.

However, the high-reflectance silver mirrors of the prior art involve disadvantages given below.

The conventional reflecting silver film used in the silver mirrors is usually formed by means of a dry vacuum deposition process such as vacuum vapor deposition, sputtering, and ion-plating. By such a dry process, the reflecting silver film may be formed with difficulty on an article in a complicated shape, or the production thereof on the complicated article may require a complicate film-forming apparatus and a complicate production process, raising the film forming cost.

For the cost reduction of the film formation, wet processes are investigated: the process including the silver mirror reaction, and an autocatalytic electroless plating. However, the phosphorus-containing glass as the base material is less resistant to chemicals. Therefore, in formation of the film by a wet process directly on the phosphorus-containing glass base material, the phosphorus component may be dissolved out so that the base material may be collapsed, and in other words, the surface of the base material may be damaged remarkably to become useless for optical elements, disadvantageously.

SUMMARY OF THE INVENTION

An object of the present invention is to provide a silver mirror producible at a lower cost and having a high-reflectivity. Another object of the present invention is to provide a process for producing the silver mirror. A still another object of the present invention is to provide a reflecting optical element employing the silver mirror.

The present invention provides a high-reflectance silver mirror comprising a base material made of phosphorus-containing glass and a high-reflectance film comprising a silver layer formed thereon, the high-reflectance film being formed by a wet film-forming method on an acid-resistant protection film provided on the base material.

The present invention also provides a reflecting optical element having a light travel path and a light reflection face provided in the light travel path, the light reflection face comprising the high-reflectance silver mirror of the above constitution.

The present invention also provides a process for producing a high-reflectance silver mirror comprising a base material made of phosphorus-containing glass and a high-reflectance film comprising a silver layer formed thereon, comprising the steps of coating the base material with an acid-resistant protection film, and forming the high-reflectance film on the acid-resistance protection film by a wet film-forming method.

According to the present invention, the base material made of phosphorus-containing glass is protected by a protection film formed of an acid-resistant material, whereby the silver layer can be formed by a wet film-forming process without causing the phosphorus-containing glass to be dissolved in the solution and also without causing the base material of phosphorus-containing glass to be collapsed.

DESCRIPTION OF THE PREFERRED EMBODIMENTS

Figure 1A:
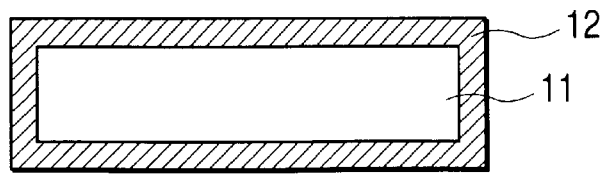
FIG. 1A is a sectional view of a base material for explaining the surface treatment of the base material in Example 1.

The silver mirror base material used in the present invention is made of phosphorus-containing glass, for example, glass having a low melting point, being formable in a mold into an optical element, and having optical transparency.

Any of wet film-forming processes can be employed in the present invention provided that the process is capable of producing the silver layer of a desired performance and a desired quality on the base material. The wet film-forming process preferably includes electroless plating; in particular, autocatalytic electroless plating. The autocatalytic electroless plating causes a silver deposition reaction to take place selectively on the optical base material. This process enables control of the reaction velocity according to the composition of the plating bath, thereby avoiding a waste of the plating bath. Also, this process produces a silver layer of a sufficiently uniform thickness, thereby advantageously providing a silver layer having uniform distribution of the reflection properties.

Generally, in the autocatalytic electroless plating, a catalytic metal or a catalytic metal ion is applied onto the base material for the purpose of accelerating a metal deposition reaction in the plating bath, and the base material having been given the catalyst is immersed into the plating bath to cause the metal deposition reaction to proceed on the base material so that the plating is carried out.

The catalytic metal or the catalytic metal ion for accelerating the metal deposition reaction on the base material in the plating bath is not specially limited, provided that the metal or metal ion is capable of accelerating the silver deposition reaction in the electroless silver plating bath. Preferably, metals such as gold, silver, copper palladium, cobalt, tin, and nickel; metal ions thereof; and colloids containing these metals or metal ions may be used in the present invention.

The surface of the base material may be pretreated for uniform application of the catalytic metal or catalytic metal ion onto the base material in the plating bath. The pretreatment of the base material surface may include various kinds of treatments for lowering surface energy of the film-forming face of the base material such as etching with an acid or an alkali, UV-ozone treatment, corona discharge treatment, and excimer irradiation; treatments for surface hydrophilicity with a material having a polar group such as surfactants; and combinations of the above treatments. With the above treatments appropriately selected, the catalytic metal or catalytic metal ion can be applied uniformly on the base material.

The catalytic metal ion, which is less adsorptive to the base material may, in some cases, fall off the base material into the plating bath to accelerate decomposition of the metal bath. To prevent such an undesirable phenomenon, the catalytic metal ion may preferably be reduced to be fixed as the catalytic metal on the base material. There is no particular limitation on the reducing agent to be used at that time, and any reducing agent commonly used may be utilized for the reduction.

The electroless plating bath for forming the silver layer contains a soluble silver ion, a reducing agent for reducing the silver ion to deposit it on the base material, a chelating agent for formation of a silver ion chelate to stabilize the plating bath, a pH-controlling agent for preventing increase of the hydrogen ion caused by oxidation of the reducing agent to prevent dropping of the driving force of the plating reaction, and other additives.

The reducing agent is not limited provided that it is capable of reducing the silver ion dissolved in the plating bath, and formaldehyde, Rochelle salt, hydrazine, and hydrazine-borane may preferably used. Cobalt sulfate is also useful therefor as described in HU201360B (Hungarian Patent Publication).

Also, the chelating agent is not limited provided that it is capable of forming a chelate with the silver ion dissolved in the plating bath to prevent deposition of the silver in the plating bath and capable also of easily depositing the silver onto the base material with the aid of the catalyst adsorbed by the base material. Cyan or the like may be used. However, the cyan is extremely toxic and is not preferred for industrial use. As described in the patent publication HU201360B, ammonia or an ammonia derivative may be used as the chelating agent.

The acid-resistant protection layer, which is provided in the vicinity of the base material side relative to the silver layer, should preferably be resistant to the acids to prevent penetration of an acidic substance from the plating bath into the base material surface, have suitable properties as a foundation for the high-reflectance silver layer, and have sufficient transparency as an optical film. The material for the acid-resistant protection layer may preferably include various resins such as acrylic resins, polycarbonate resins, polystyrene resins, amorphous polyolefin resins, and amorphous fluororesins; metal fluorides such as $MgF_2$; metal oxides such as $SiO_2$, $TiO_2$, $ZrO_2$, $Al_2O_3$, $ZnO_2$, and $SnO_2$; and materials constituted of hydrolyzates of metal alkoxides. Of these, metal alkoxides and metal alkoxide hydrolyzates may particularly preferably used because those materials are excellent in the acid resistance and ease to form a film on the phosphorus-containing glass base material, and further can provide a better foundation for the formation of the silver layer.

The metal alkoxide may include the compounds represented by general Formulas (I) and (II):

$$M(OR)_a \qquad (I)$$

$$M(OR)_n(X)_{a-n} \qquad (II)$$

where M is an atom selected from the group consisting of Si, Al, Ti, Zr, Ca, Fe, V, Sn, Li, Be, and B; R is an alkyl group; X is an alkyl group, an alkyl group having a functional group, or a halogen atom; a is the valence of M; and n is an integer from 1 to a. The group X may preferably include alkyl groups having at least one functional group of carbonyl, carboxyl, amino, vinyl, and epoxy.

Particularly preferable metal alkoxides may include $Si(OC_2H_5)_4$, $Al(O-i-C_3H_7)_3$, $Ti(O-i-C_3H_7)_4$, $Zr(O-t-C_4H_9)_4$, $Zr(O-n-C_4H_9)_4$, and $Sn(O-t-C_4H_9)_4$.

The acid-resistant protection layer may be formed, for example, by dissolving a metal alkoxide in a suitable solvent, applying the solution onto the glass base material for coating, and heating and baking the coating substance; or otherwise by dissolving a metal alkoxide in a suitable solvent together with water or an acidic catalyst for accelerating the hydrolysis of the alkoxide, applying the solution onto the glass base material for coating, and heating and baking the coating substance to form a film. The temperature conditions for the heating and baking are selected so that a thin film of desired properties and quality can be obtained and, at the same time, the base material is not adversely affected.

The acid-resistant protection layer may have a thickness ranging preferably from 0.01 $\mu$m to 1 $\mu$m.

Figure 5:
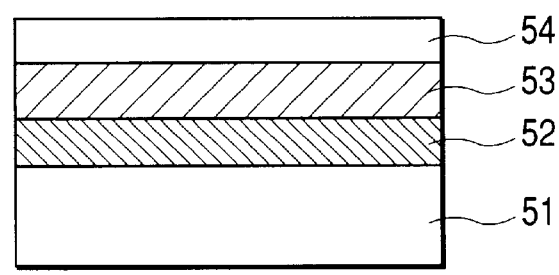
FIG. 5 is a schematic sectional view of a still another example of the constitution of the silver mirror of the present invention.

In the case where the light traveling and penetrating through the interior of the base material is reflected (reflection occurring at the back face or inside face of the silver layer) in the high-reflectance silver mirror of the present invention, at least a higher-refractivity thin film and a lower-refractivity thin film are formed in this order from the side of the base material as an interlayer between the base material and the silver layer, and at least the film contacting with the silver layer is made an acid-resistant protection layer. With this constitution, the silver layer can be formed by a wet film-forming process on the base material of phosphorus-containing glass, and as a result, a high-reflectance silver mirror which can further increase the reflection at the silver layer can be provided. FIG. 5 shows an example of such a constitution.

This higher-refractivity thin film can be formed from a metal oxide such as $TiO_2$, $ZrO_2$, and $Al_2O_3$; or a hydrolyzate of a metal alkoxide such as $Al(O\text{-}i\text{-}C_3H_7)_3$, $Ti(O\text{-}i\text{-}C_3H_7)_4$, and $Zr(O\text{-}t\text{-}C_4H_9)_4$. The lower-refractivity thin film can be formed from a metal fluoride such as $MgF_2$, a metal oxide such as $SiO_2$, a hydrolyzate of a metal alkoxide such as $Si(OC_2H_5)_4$, or a low refractivity resin such as an amorphous fluororesin. One or both of the higher-refractivity thin film and the lower-refractivity thin film can be formed by a wet film-forming process or a dry film-forming process such as vacuum deposition.

Figure 6:
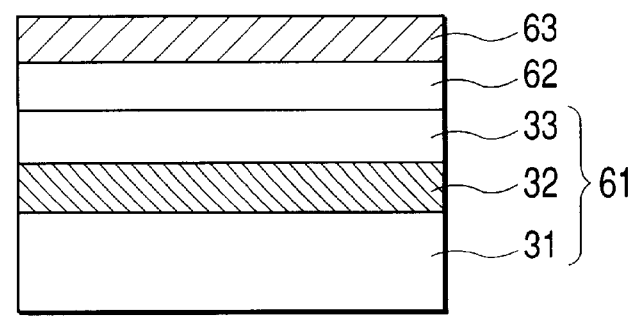
FIG. 6 is a schematic sectional view of a further example of the constitution of the silver mirror of the present invention.

In the other case where the light projected from outside the base material is reflected directly by the silver layer (reflection occurring at the front face or outside face of the silver layer), a lower-refractivity thin film and a higher-refractivity thin film may be formed in this order on the silver layer. FIG. 6 shows an example of such a constitution, in which the layer 32 is an acid-resistant protection layer made of acrylic resin. Any known constitution may be employed as the constitution of the thin films. In this case, the refractivity thin films need not be acid-resistant.

A functional thin film may be provided on the base material as necessary in addition to the silver layer, the higher-refractivity thin film and the lower-refractivity thin film.

For better optical properties, the reflectivity (R) of the front face or the back face of the silver mirror formed by the wet film-forming process may preferably be in the range of $89.0\% < R < 99.5\%$ (at 400 to 900 nm). For obtaining the high reflectivity and higher quality of the silver layer without defects such as cracking of the film, the thickness (d) of the silver layer may preferably be in the range of $0.1 \ \mu m < d < 1 \ \mu m$.

The silver mirror of the present invention can be used as a reflection face in a light travel path in optical systems having combination of a reflection mirror, a prism, a lens and other optical elements.

EXAMPLES

The present invention is described below in more detail by reference to examples.

Example 1 and Comparative Example 1

Figure 1B:
FIG. 1B is a sectional view of a base material for explaining the surface treatment of the base material in Comparative Example 1.

FIGS. 1A and 1B show the reflection film constitutions of the silver mirrors of Example 1 and Comparative Example 1, respectively. In Example 1 (FIG. 1A), on the entire face of a phosphorus-containing glass base material 11 which was formed with a metal mold into a desired shape, a $TiO_2$ layer 12 (100 nm) was formed by vacuum vapor deposition. In Comparative Example 1 (FIG. 1B), the $TiO_2$ layer was not formed. In addition, the glass base material 11 is formed of phosphorus type glass containing about 10 to 20 atomic % of phosphorus (trade name: LPHL-1, produced by Ohara Co.).

On the above two different base materials was coated an Ag layer (150 nm) by means of a silver mirror reaction to prepare high-reflectance silver mirrors. The silver mirror reaction for the coating was conducted by immersion using the solutions having the compositions shown in Table 1. In the immersion coating, the base material was firstly immersed in the silver solution shown in Table 1, and the reducing solution was then added thereto dropwise.

In Comparative Example 1, the base material began to be corroded or dissolved on immersion thereof into the silver solution and was collapsed, so that any silver mirror could not be formed. In Example 1, a high-reflectance silver mirror was obtained.

Also, when phosphorus type glass containing about 10 to 20 atomic % of phosphorus (trade name: PSK 50, produced by Sumita Optical Glass Co., Ltd.) was used as the glass base material in Example 1 and Comparative Example 1, similar results were obtained.

TABLE 1

| Silver solution | | Reducing solution | |
|---|---|---|---|
| Silver nitrate | 20 g | Formaldehyde (37%) | 5.4 g |
| Ammonia (28%) | 20 mL | Water | 14.6 g |
| water | 300 mL | | |

Example 2

Figure 2:
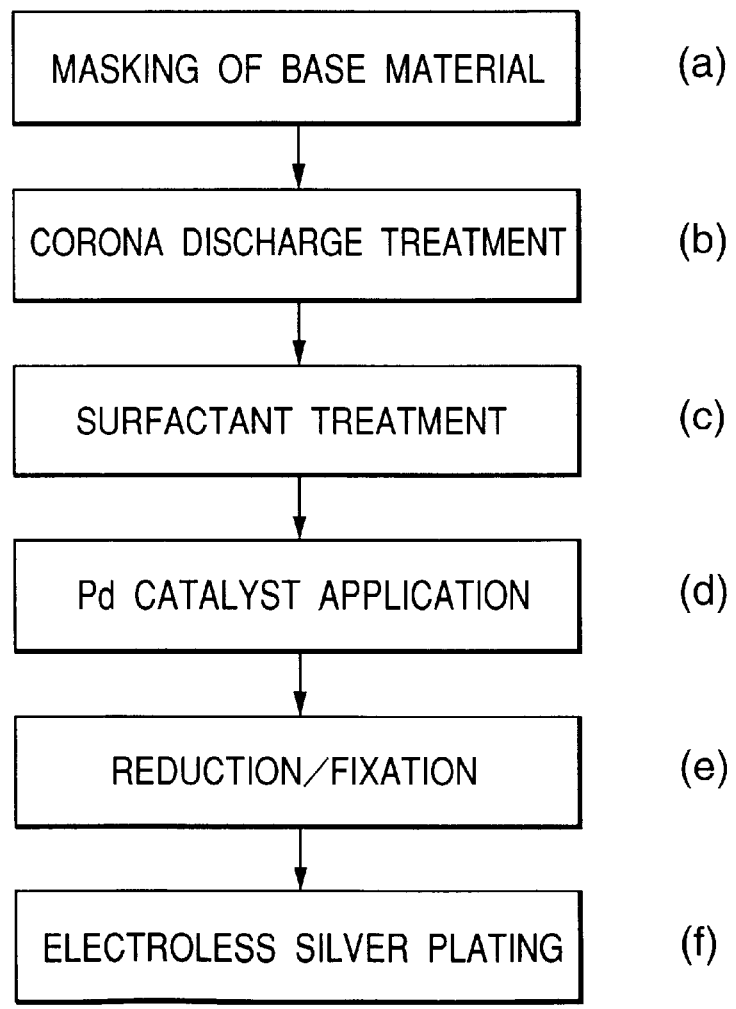
FIG. 2 is a flow chart of an example of treatments in the electroless plating process.

On the entire face of a glass base material made of the phosphorus-containing glass (trade name: LPHL-1) which was formed with a metal mold into a desired shape, a $TiO_2$ layer (100 nm) was formed by the vacuum vapor deposition. Further on the $TiO_2$ layer, an Ag layer was formed and superposed by an electroless plating method through the steps shown in FIG. 2. The steps of FIG. 2 are explained below in detail. The portion of the $TiO_2$ layer on the base material where the silver layer was not to be formed was masked (Step (a)). The surface of the base material was then treated by corona discharge using a corona discharger (manufactured by Kasuga Denki Co., Ltd. (Step (b)). Thereafter, the base material was immersed into an aqueous 20 mL/L solution of a surfactant (Predip Neoganth B, produced by Atotech Japan Co., Ltd.) for one minute (Step (c)), and further the base material was immersed into an aqueous 50 mL/L solution of Activator Neoganth 834 (produced by Atotech Japan Co., Ltd.) at 35° C. for 5 minutes for Pd catalyst application (Step (d)). After the treatment, the base material was washed with water for 2 minutes and then treated for reduction (Step (e)) by immersion into an aqueous 5 mL/L solution of Reducer Neoganth WA (produced by Atotech Japan Co., Ltd.) as the reducing agent for 5 minutes. The base material was washed again with water for 2 minutes, and immersed in an electroless silver plating bath having a composition shown in Table 2 for 15 minutes for electroless silver plating (Step (f)). Finally the mask formed in the above Step (a) was removed to obtain a high-reflection silver mirror.

TABLE 2

| Component and conditions | Concentration and conditions |
|---|---|
| Silver nitrate | 6.8 g/L |
| Cobalt nitrate heptahydrate | 28 g/L |
| Aqueous ammonia (28%) | 121 g/L |
| Ammonium sulfate | 99 g/L |
| pH | 10.0 |
| Temperature | 25° C. |

Example 3

Figure 3:
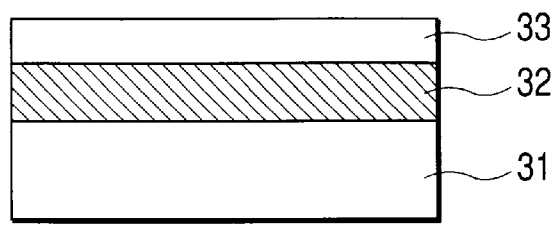
FIG. 3 is a schematic sectional view of an example of the constitution of the silver mirror of the present invention.

The construction of a reflectance film of a silver mirror in this Example is shown in FIG. 3. A base material 31 made of phosphorus-containing glass for preparing optical elements (trade name: PSK 50) was coated with a water-soluble acrylic resin 32 (200 nm) (Top Guard YD: aqueous ¼ dilution solution, produced by Okuno Chemical Industry Co., Ltd.) by a dip coating method. The base material-drawing speed was controlled to be 80 mm/min. The acrylic resin-coated base material was baked at 100° C. for 30 minutes. On the acrylic resin layer 32, an Ag layer 33 (150 nm) was formed by the electroless silver plating in the same manner as in Example 2 to obtain a high-reflectance silver mirror.

Example 4

Figure 4:
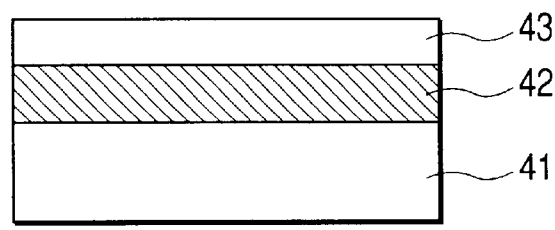
FIG. 4 is a schematic sectional view of another example of the constitution of the silver mirror of the present invention.

The construction of a reflectance film of a silver mirror in this Example is shown in FIG. 4. On a base material 41 made of phosphorus-containing glass (trade name: LPHL-1) which was formed with a metal mold into a desired shape, a $TiO_2$ layer 42 (100 nm) was formed by means of a sol-gel process. The process of $TiO_2$ film formation is explained below in detail.

In 500 g of ethanol was dissolved 15 g of titanium tetraisopropoxide ($Ti(O-i-C_3H_7)_4$). Thereto 0.1 g of hydrochloric acid (35 wt %) was added. This solution was employed as the $TiO_2$ coating solution. This coating solution was applied onto the surface of the base material by a dip coating method at a drawing speed of 100 mm/min. The coating layer was baked at 250° C. for 15 minutes.

On the base material coated with the $TiO_2$ layer 42, an Ag layer 43 (150 nm) was overlaid by the electroless plating process in the same manner as in Example 2 to obtain a high-reflectance silver mirror.

Example 5

The construction of a reflectance film of a silver mirror in this Example is shown in FIG. 5. On a base material 51 made of phosphorus-containing glass (trade name: LPHL-1) as formed with a metal mold into a desired shape, an amorphous fluororesin layer 52 (100 nm) was formed by the dip coating method. The coating solution was a 1 wt % solution of an amorphous fluororesin (trade name: CYTOPCTL-801M,) in a solvent (trade name: CT-Solv. 100, produced by Asahi Glass Co.). The speed of drawing the base material was 80 mm/min. The base material thus coated with the amorphous fluororesin was baked at 100° C. for 30 minutes.

On the base material having been coated with the amorphous fluororesin film, a $TiO_2$ layer 53 (100 nm) was overlaid in the same manner as in Example 4. Further, an Ag layer 54 (150 nm) was formed thereon by the electroless plating process in the same manner as in Example 2 to obtain a high-reflectance silver mirror.

Example 6

The construction of a reflectance film of a silver mirror in this Example is shown in FIG. 6. On the silver layer 33 as obtained in the same manner as in Example 3, an amorphous fluororesin layer 62 (100 nm) was formed in the same manner as in Example 5. Further, on the amorphous fluororesin layer, a $TiO_2$ thin film 63 (100 nm) was overlaid in the same manner as in Example 4 to obtain a high-reflectance silver mirror.

What is claimed is:

1. A high-reflectance silver mirror comprising a base material made of phosphorus-containing glass and a high-reflectance film comprising a silver layer formed thereon, the high-reflectance film being formed by a wet film-forming method on an acid-resistant protection film provided on the base material.

2. The high-reflectance silver mirror according to claim 1, wherein the wet film-forming method is an electroless plating process.

3. The high-reflectance silver mirror according to claim 1, wherein the acid-resistant protection film is formed by a wet film-forming method.

4. The high-reflectance silver mirror according to claim 1, wherein the acid-resistant protection film is formed by applying a solution containing a metal alkoxide or a metal alkoxide hydrolyzate onto the base material to form a coating layer, followed by heating and baking the coating layer.

5. The high-reflectance silver mirror according to claim 1, wherein an interlayer is provided comprising at least a higher-refractivity thin film and a lower-refractivity thin film superposed in this order from the side of the base material between the base material and the silver layer, and at least the thin film contacting with a silver layer-forming solution has acid resistance.

6. The high-reflectance silver mirror according to claim 1, wherein a lower-refractivity thin film and a higher-refractivity thin film are superposed in this order as an upper layer on the silver layer.

7. The high-reflectance silver mirror according to claim 1, wherein the front face or the back face of the silver layer has a reflectivity (R) in the range of $89.0\% < R < 99.5\%$ in the wavelength range from 400 nm to 900 nm, and the thin silver layer has a thickness (d) in the range of $0.1\ \mu m < d < 1\ \mu m$.

8. A reflecting optical element having a light travel path and a light reflection face provided in the light travel path, the light reflection face comprising a high-reflectance silver mirror as set forth in any one of claims 1 to 7.

9. A process for producing a high-reflectance silver mirror comprising a base material made of phosphorus-containing glass and a high-reflectance film comprising a silver layer formed thereon, comprising the steps of:

coating the base material with an acid-resistant protection film, and forming the high-reflectance film on the acid-resistance protection film by a wet film-forming method.

10. The process according to claim 9, wherein the wet film-forming method is an electroless plating process.

11. The process according to claim 9, wherein the acid-resistant protection film is formed by a wet film-forming method.

12. The process according to claim 9, wherein the acid-resistant protection film is formed by applying a solution containing a metal alkoxide or a metal alkoxide hydrolyzate onto the base material to form a coating layer, followed by heating and baking the coating layer.

13. The process according to claim 9, wherein an interlayer is provided comprising at least a higher-refractivity thin film and a lower-refractivity thin film superposed in this order from the side of the base material between the base material and the silver layer, and at least the thin film contacting with a silver layer-forming solution has acid resistance.

14. The process according to claim 9, wherein a lower-refractivity thin film and a higher-refractivity thin film are superposed in this order as an upper layer on the silver layer.

15. The process according to claim 9, wherein the front face or the back face of the silver layer has a reflectivity (R) in the range of $89.0\% < R < 99.5\%$ in the wavelength range from 400 nm to 900 nm, and the thin silver layer has a thickness (d) in the range of $0.1\ \mu m < d < 1\ \mu m$.

* * * * *